US011968249B1

(12) United States Patent
Zhang et al.

(10) Patent No.: US 11,968,249 B1
(45) Date of Patent: Apr. 23, 2024

(54) IMPROVING COMMUNICATION PROTOCOLS RELATING TO TRANSACTIONS WITHIN CLOUD COMPUTING ENVIRONMENTS

(71) Applicant: International Business Machines Corporation, Armonk, NY (US)

(72) Inventors: Shuo Zhang, Beijing (CN); Dian Guo Zou, Beijing (CN); Jing Jing Wei, Beijing (CN); Da Guang Sun, Beijing (CN); Yue Wang, Beijing (CN); Ping Mei, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/215,684

(22) Filed: Jun. 28, 2023

(51) Int. Cl.
*H04L 67/1001* (2022.01)
*G06F 9/46* (2006.01)

(52) U.S. Cl.
CPC .......... *H04L 67/1001* (2022.05); *G06F 9/466* (2013.01)

(58) Field of Classification Search
CPC .............................. H04L 67/1001; G06F 9/466
See application file for complete search history.

(56) References Cited

U.S. PATENT DOCUMENTS

| 79,129,732 | 3/2011 | Feingold |
| 10,616,109 B1 | 4/2020 | Liu |

(Continued)

FOREIGN PATENT DOCUMENTS

| CN | 109067914 B | 12/2019 |

OTHER PUBLICATIONS

K. Jaleel; "Routing to internal Kubernetes services using proxies and Ingress controllers" in Holiday Extras Tech Team, Sep. 11, 2017; https://tech.holidayextras.com/routing-to-internal-kubernetes-services-using-proxies-and-ingress-controllers-e7eb44954d53.

(Continued)

*Primary Examiner* — Kostas J Katsikis
(74) *Attorney, Agent, or Firm* — David K. Mattheis

(57) ABSTRACT

A coordinator module for improving communications within a cloud computing system is disclosed. The coordinator module initiates transaction requests by generating a coordination context, where the coordination context includes a transaction context, a coordination type, and an initiator supplemental address. The coordinator module includes a supplemental address handler for creating the initiator supplemental address that unique identifies the coordinator module and the associated pod. The coordinator module receives transaction responses, where the transaction response includes a coordination context. The coordinator module includes a transaction context checker to verify that the transaction response was not received in error, by comparing the received transaction context with a saved transaction context. The coordinator module includes a registration bridge that identifies an alternate coordinator module and alternate pod to process the transaction response if the transaction contexts do not match. The registration bridge compares the received initiator supplemental address with a saved supplemental address that uniquely identifies each coordinator module and associated pods in the cloud partition. The registration bridge forwards the transaction request to the alternate coordinator module if a match is found, thereby creating a communication path to successfully process the transaction. If no match is found, the coordinator module indicates that the transaction must be retried. A corresponding method and computer program product are also disclosed.

20 Claims, 6 Drawing Sheets

(56) References Cited

U.S. PATENT DOCUMENTS

| | | | |
|---|---|---|---|
| 2014/0013409 A1* | 1/2014 | Halageri | H04L 63/0815 726/8 |
| 2019/0310877 A1* | 10/2019 | Moore | G06F 11/00 |
| 2021/0314239 A1 | 10/2021 | Shen et al. | |
| 2021/0385176 A1 | 12/2021 | Edamadaka | |
| 2022/0210113 A1* | 6/2022 | Pillareddy | H04L 61/103 |

OTHER PUBLICATIONS

Various Anonymous; "About Ingress", IBM Product Guide for Red Hat Open Shift of IBM Cloud, last updated May 22, 2023; https://cloud.ibm.com/docs/openshift?topic=openshift-ingress-about-roks4.

Various Anonymous; "Kubernetes Ingress Annotations", IBM Product Guide for Kubernetes Service in IBM Cloud, last updated Aug. 2, 2022; https://cloud.ibm.com/docs/containers?topic=containers-comm-ingress-annotations.

IBM, "Adding the transaction ID to HTTP headers to help correlate transactions between packet capture and logs in DataPower", <https://www.ibm.com/support/pages/adding-transaction-id-http-headers . . . >, 2 PGS, Aug. 24, 2022.

IBM, "Configuring an intermediary node for web services transactions", Updated Feb. 13, 2023, 2 PGS, <https://www.ibm.com/docs/en/was-nd/8.5.5?topic=services-configuring . . . >.

Jellema; Amis Conclusion Technology Blog, "Invoke an Asynchronous Web Service from Java (using only Java SE, no Java EE container)", Jun. 4, 2014, 25 PGS.

Oasis, "Web Services Atomic Transaction (WS-AtomicTransaction) Version 1.2", Oct. 2, 2008, 2 PGS.

Oasis, "Web Services Business Activity (WS-BusinessActivity) Version 1.1", Apr. 16, 2007, <http://docs.oasis-open.org/ws-tx/wstx-wsba-1.1-spec-os/wstx-wsba-1.1 . . . >, 32 PGS.

Oasis, "Web Services Coordination (WS-Coordination) Version 1.2", Oct. 2, 2008, 2 PGS.

Sidecar, <https://istio.io/latest/docs/reference/config/networking/sidecar/>, Downloaded Aug. 24, 2022, 7 PGS.

WebSphere Application Server Liberty, "Web Services Atomic Transaction overview", Aug. 24, 2022, <https://www.ibm.com/docs/en/was-liberty/base?topic=liberty-web-servi . . . >, 4 PGS.

* cited by examiner

IMPROVING COMMUNICATION PROTOCOLS RELATING TO TRANSACTIONS WITHIN CLOUD COMPUTING ENVIRONMENTS

BACKGROUND

Field of the Invention

This invention relates generally to computer processor systems, and more particularly to systems and methods for improving communication protocols relating to transactions and information transfers occurring between separate subsystems within cloud computing system environments.

Background of the Invention

Computer processing systems have grown tremendously in size and complexity in recent years, handling large amounts of data and transactions faster and more efficiently, securely, and responsively. In particular, cloud computing systems have grown also to become a primary environment for consumers, users, and employees of large and small businesses to manage information. Cloud computing systems allow individuals and enterprises to manage large amounts of information without maintaining large Information Technology (IT) centers. Cloud computing systems have evolved into massive networks of computers and servers located in a single data center that is accessed remotely by many users. Cloud computing systems are scalable and provide numerous services to the users including storage, security, networking, analytics, software applications, and database management.

Cloud computing systems include large complex systems of servers, computers, networks, switches, routers, and storage devices. The system components are grouped into subsystems and pods, and use communication protocols to transfer information and data between the subsystems as needed to complete transactions. As the complexity of the cloud computing infrastructure increases, load balancing techniques are deployed within the cloud computing system to increase the efficiency, speed, and bandwidth of the overall cloud computing system performance. These load balancing techniques can complicate transactions, as the return path of the transaction may differ from the forward path of the transaction between an initiator and a target.

In view of the foregoing, systems and methods are needed that improve communication protocols relating to information transfers and transactions that occur between initiator and target subsystems in large complex computer processing systems, such as those including within cloud computing systems.

SUMMARY

The invention has been developed in response to the present state of the art and, in particular, in response to the problems and needs in the art that have not yet been fully solved by currently available systems and methods. The features and advantages of the invention will become more fully apparent from the following description and appended claims, or may be learned by practice of the invention as set forth hereinafter.

According to an embodiment of the invention described herein, a coordinator module is provided for improving communications within a cloud computing system having multiple partitions, where each partition includes multiple logical groupings of computing resources (pods). In an embodiment, each pod includes a coordinator module, and the coordinator module includes control logic, processing logic, and storage. In an embodiment, the coordinator module generates a coordination context to initiate a transaction request. The coordination context includes a transaction context, a coordination type, and an initiator reference address. In an embodiment, the coordinator module creates an initiator supplemental address by combining the initiator reference address with a unique identifier relating to the coordinator module and its associated pod. The coordinator module then saves the initiator supplemental address and the transaction context in locations in the coordinator module storage. In an embodiment, the coordinator module transmits the transaction request and the coordination context to a target pod.

In an embodiment, the coordinator module receives a transaction response, reviews the received coordination context, and compares the received initiator supplemental address with the saved initiator supplemental address to determine if the coordinator module handles the transaction response. In an embodiment, the coordinator module identifies the alternate coordinator and alternate pod to handle the transaction response if the received initiator supplemental address does not match the saved initiator supplemental address for the coordinator module. In an embodiment, the coordinator module forwards the transaction response to the alternate coordinator module and alternate pod. In an embodiment, the coordinator module compares the received transaction context with the saved transaction context to determine if the coordinator module handles the transaction response. In an embodiment, the coordinator module, forwards the transaction response to the alternate coordinator module if the transaction contexts do not match. In an embodiment, the coordinator module includes a supplemental address handler for creating the initiator supplemental address and for comparing the received initiator supplemental address with the saved supplemental address. In an embodiment, the coordinator module further includes a transaction context checker for comparing the received transaction context with the saved transaction context. In an embodiment, the coordinator module further includes a registration bridge to identify the alternate coordinator module and to forward the transaction request to the alternated coordinator module within the same cloud computing system partition. In an embodiment, the cloud computing system partition includes a load balancer for monitoring the available computing resources in each pod within the partition and for directing incoming transactions to the pods having the most available computing resources.

According to another embodiment of the invention described herein, a method is disclosed for improving the communications within a cloud computing system having multiple partitions, where each partition includes multiple logical groupings of computing resources (pods). In an embodiment, each pod includes a coordinator module, and the coordinator module includes control logic, processing logic, and storage. In an embodiment, the method includes the coordinator module generating a coordination context to initiate a transaction request. The coordination context includes a transaction context, a coordination type, and an initiator reference address. In an embodiment, the method includes the coordinator module creating an initiator supplemental address by combining the initiator reference address with a unique identifier relating to the coordinator module and its associated pod. The method further includes the coordinator module saving the initiator supplemental address and the transaction context in locations in the coordinator module storage. In an embodiment, the method includes the coordinator module transmitting the transaction request and the coordination context to a target pod.

In an embodiment, the method includes the coordinator module receiving a transaction response, reviewing the received coordination context, and comparing the received initiator supplemental address with the saved initiator supplemental address to determine if the coordinator module handles the transaction response. In an embodiment, the method includes the coordinator module identifying the alternate coordinator and alternate pod to handle the transaction response if the received initiator supplemental address does not match the saved initiator supplemental address for the coordinator module. In an embodiment, the method includes the coordinator module forwarding the transaction response to the alternate coordinator module and alternate pod. In an embodiment, the method includes the coordinator module comparing the received transaction context with the saved transaction context to determine if the coordinator module handles the transaction response. In an embodiment, the method includes the coordinator module forwarding the transaction response to the alternate coordinator module if the transaction contexts do not match.

In an embodiment, the coordinator module includes a supplemental address handler, a transaction context checker, and a registration bridge. In an embodiment, the method further includes the supplemental address handler creating the initiator supplemental address and for comparing the received initiator supplemental address with the saved supplemental address. In an embodiment, the method further includes the transaction context checker comparing the received transaction context with the saved transaction context. In an embodiment, the method further includes the registration bridge identifying the alternate coordinator module and forwarding the transaction request to the alternated coordinator module within the same cloud computing system partition. In an embodiment, the cloud computing system partition includes a load balancer for monitoring the available computing resources in each pod within the partition and for directing incoming transactions to the pods having the most available computing resources. In an embodiment, the method includes the coordinator module transmitting the transaction request to a load balancer in a different partition, and the load balancer directing the transaction request to a target pod. In an embodiment, the method includes the coordinator module receiving the transaction response from the load balancer in its partition, and the load balancer directing the transaction response to the coordinator module.

According to another embodiment of the invention described herein, a computer program product is provided for improving the communications in a cloud computing system having multiple partitions, where each partition includes multiple logical groupings of computing resources (pods). In an embodiment, the pod includes a coordinator module, and the coordinator module includes control logic, processing logic, storage, and a computer program product. In an embodiment, the computer program product includes a non-transitory computer-readable storage medium having computer-usable program code embodied therein. In an embodiment, the computer-usable program code is configured to perform operations when executed by the processing logic. In an embodiment, the computer program product operations include the coordinator module generating a coordination context to initiate a transaction request. The coordination context includes a transaction context, a coordination type, and an initiator reference address. In an embodiment, the computer program product operations include the coordinator module creating an initiator supplemental address by combining the initiator reference address with a unique identifier relating to the coordinator module and its associated pod. The computer program product operations further include the coordinator module saving the initiator supplemental address and the transaction context in locations in the coordinator module storage. In an embodiment, the computer program product operations include the coordinator module transmitting the transaction request and the coordination context to a target pod.

In an embodiment, the computer program product operations include the coordinator module receiving a transaction response, reviewing the received coordination context, and comparing the received initiator supplemental address with the saved initiator supplemental address to determine if the coordinator module handles the transaction response. In an embodiment, the computer program product operations include the coordinator module identifying the alternate coordinator and alternate pod to handle the transaction response if the received initiator supplemental address does not match the saved initiator supplemental address for the coordinator module. In an embodiment, the computer program product operations include the coordinator module forwarding the transaction response to the alternate coordinator module and alternate pod. In an embodiment, the computer program product operations include the coordinator module comparing the received transaction context with the saved transaction context to determine if the coordinator module handles the transaction response. In an embodiment, the computer program product operations include the coordinator module forwarding the transaction response to the alternate coordinator module if the transaction contexts do not match.

In an embodiment, the coordinator module includes a supplemental address handler, a transaction context checker, and a registration bridge. In an embodiment, the computer program product operations include the supplemental address handler creating the initiator supplemental address and for comparing the received initiator supplemental address with the saved supplemental address. In an embodiment, the computer program product operations include the transaction context checker comparing the received transaction context with the saved transaction context. In an embodiment, the computer program product operations include the registration bridge identifying the alternate coordinator module and forwarding the transaction request to the alternate coordinator module within the same cloud computing system partition. In an embodiment, the cloud computing system partition includes a load balancer for monitoring the available computing resources in each pod within the partition and for directing incoming transactions to the pods having the most available computing resources. In an embodiment, the computer program product operations include the coordinator module transmitting the transaction request to a load balancer in a different partition, and the load balancer directing the transaction request to a target pod. In an embodiment, the computer program product operations include the coordinator module receiving the transaction response from the load balancer in its partition, and the load balancer directing the transaction response to the coordinator module.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Exemplary embodiments of improving communication protocols relating to transactions and information transfers within a complex computer processing system, such as a cloud computing system are described herein. The cloud computing system includes servers, networks, routers, and storage devices for performing computer processing functions and controls. The cloud computing systems further includes software, firmware, and logic for processing applications, and performing management, service, and security tasks within the cloud computing system. The cloud computing system can be partitioned into multiple subsystems, each having its own components for performing computer processing functions, processing applications, and performing management, service, and security tasks. The cloud computing system uses communication protocols to facilitate transactions and information transfers between components within the system. Transactions often occur between an initiator in a first partitioned cloud subsystem and a target in a second, different partitioned cloud subsystem. Coordinator modules exist in the initiator and the target to insure that the transaction completes successfully from the initiator to the intended target. Further, the cloud computing system uses load balancing techniques to increase the throughput and performance of the system when performing transactions that span different partitioned subsystems. The load balancing modules can misdirect responses from the target to the initiator by sending the response along a different path than used when the initiator started the transaction. The invention develops an improved coordinator module in the initiator and the target that includes a supplemental address handler and a registration and protocol bridge to redirect the response from the target to the correct initiator should the load balancer misdirect the response.

Figure 1:
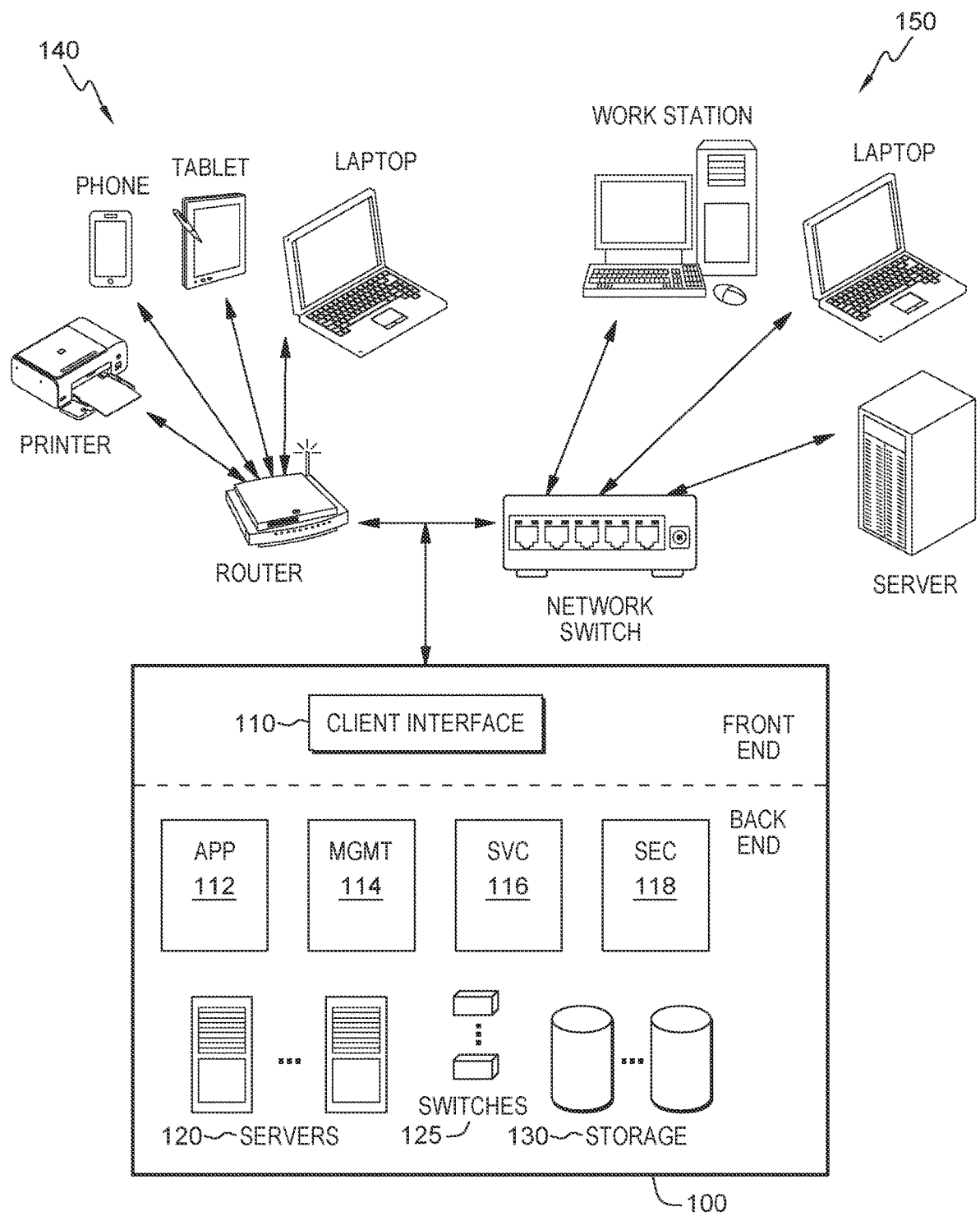
FIG. 1 is a high-level block diagram representing an example of a cloud computing system, in which systems and methods in accordance with embodiments of the invention may be implemented.

Referring to FIG. 1, a cloud computing system 100 is generally shown in accordance with an embodiment. The cloud computing system 100 can be an electronic, computer framework comprising and/or employing any number and combination of computing devices and networks utilizing various communication technologies, as described herein. In certain embodiments, the cloud computing system 100 can be easily scalable, extensible, and modular, with the ability to change to different services or reconfigure some features independently of others. In certain embodiments, the cloud computing system 100 includes servers, networks, routers, and storage devices for performing computer processing functions and controls. In certain embodiments, the cloud computing systems further includes software, firmware, and logic for processing applications, and performing management, service, and security tasks within the cloud computing system. In an embodiment, the cloud computing systems includes a front-end subsystem and a back-end subsystem. In an embodiment, the front-end subsystem includes a client interface 110 that couples to many user devices 140, 150 over an internet communication network. In certain embodiments, the user devices 140 include laptop computers, tablet computers, cellular telephones, printers, and other mobile devices 140 that couple to the internet network wirelessly via a router. In certain embodiments, the user devices 150 include servers, computer processors, computer workstations, laptop computers, and other computing devices 150 coupled to the internet network via a network switch. The user devices 140, 150 depicted in FIG. 1 are exemplary devices that couple to the cloud computing system 100 through an illustrative internet communication network. User devices can include other mobile devices such as personal digital assistants (PDAs), desktop computers, video gaming computer systems, and automotive computing systems. In addition, communication networks can include wide area networks (WAN), local area networks (LAN), cellular networks, or radio networks.

In an embodiment, the client interface 110 includes application programs, computer software, firmware, and logic to interact with the application programs, computer software, firmware, and logic in the user devices 140, 150. The client interface 110 receives requests from the user devices 140, 150 for accessing, storing, and processing information and other data. The client interface 110 forwards the user device requests to the backend subsystem for processing within the cloud computing system 100. In an embodiment, the back-end includes servers 120, storage devices 130, and switches 125 for executing the user device requests for accessing, storing, and processing information and data.

In an embodiment, the backend architecture further includes application components 112, management components 114, service components 116, and security components 118 for processing user device requests. The application components 112 mirror the application programs in the client interface 110 and the user devices 140, 150 to receive user device requests and begin processing the requests within the cloud computing system 100. The service components 114 facilitate the operation and execution of various tasks and transactions within the backend architecture of the cloud computing system 100. The service components 114 also perform administrative functions to monitor the progress of tasks and transactions and insure the ordered execution of such tasks and transactions. The management components 116 of the backend architecture allocates processing, communication, and storage resources within the backend to insure that tasks and transactions are executed efficiently. The application 112, service 114, and management 116 components operate collaboratively to transform the user device requests into certain tasks and transactions that when executed satisfy the user device requests for accessing, processing, and/or storing information within the cloud computing system 100.

In an embodiment, the security components 118 perform security functions throughout the cloud computing system 100. The security components 118 prevent data breaches using firewall protections, provide data security using encryption, decryption, and other cryptographic tools, and mitigate data loss by utilizing data backup, data mirroring, and data redundancy techniques. The security components 118 further perform error monitoring and recovery functions on all hardware, firmware, and software equipment within the cloud computing system 100. The application 112, service 114, management 116, and security 118 components may comprise software, firmware, or other program modules consisting of computer executable instructions that perform various logical tasks. Program modules may further comprise routines, programs, objects, logic, components, or data structures. Cloud computing systems 100 may also include public cloud computing systems, private cloud computing systems, and hybrid cloud computing systems.

Figure 2:
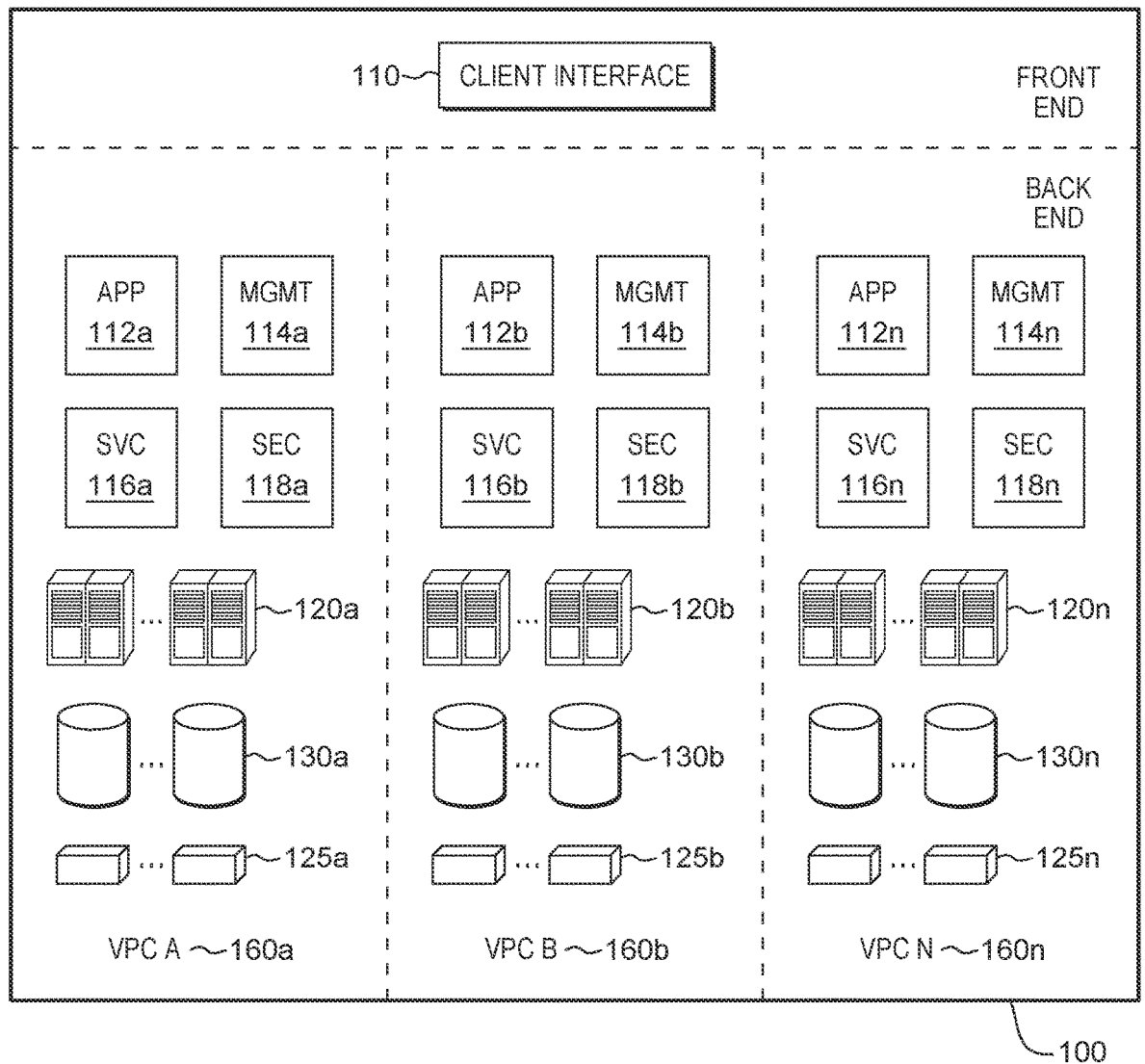
FIG. 2 is a high-level block diagram representing an example of a partitioned cloud computing system, in which systems and methods in accordance with embodiments of the invention may be implemented.

FIG. 2 represents a block diagram of a partitioned cloud computing system 100 where the backend architecture is partitioned into multiple partitioned cloud computing systems 160a, 160b, . . . 160n. The boundaries between the partitioned cloud computing systems 160a . . . 160n are logical boundaries and not necessarily physical boundaries. Each partitioned cloud computing system 160a . . . 160n includes separate logical instances of servers 120a . . . 120n, network routers and switches 125a . . . 125n, and storage devices 130a . . . 130n. Each partitioned cloud computing system 160a . . . 160n further includes separate logical instances of application 112a . . . 112n, service 114a . . . 114n, management 116a . . . 116n, and security 118a . . . 118n components. Tasks and transactions generated within the cloud computing system 100 may need to execute across logical partitions to complete user device requests for accessing, processing, and storing information and data. In an embodiment, application 112a . . . 112n, service 114a . . . 114n, and management 116a . . . 116n components across different partitioned cloud computing systems 160a . . . 160n work collaboratively to generate and execute multiple tasks and transactions that use servers 120a . . . 120n, and networks and routers 125a . . . 125n to communicate across different partitioned cloud computing systems 160a . . . 160n and to access, process, and store information and data in storage medium in storage devices 130a . . . 130n across different partitioned cloud computing systems 160a . . . 160n.

Figure 3:
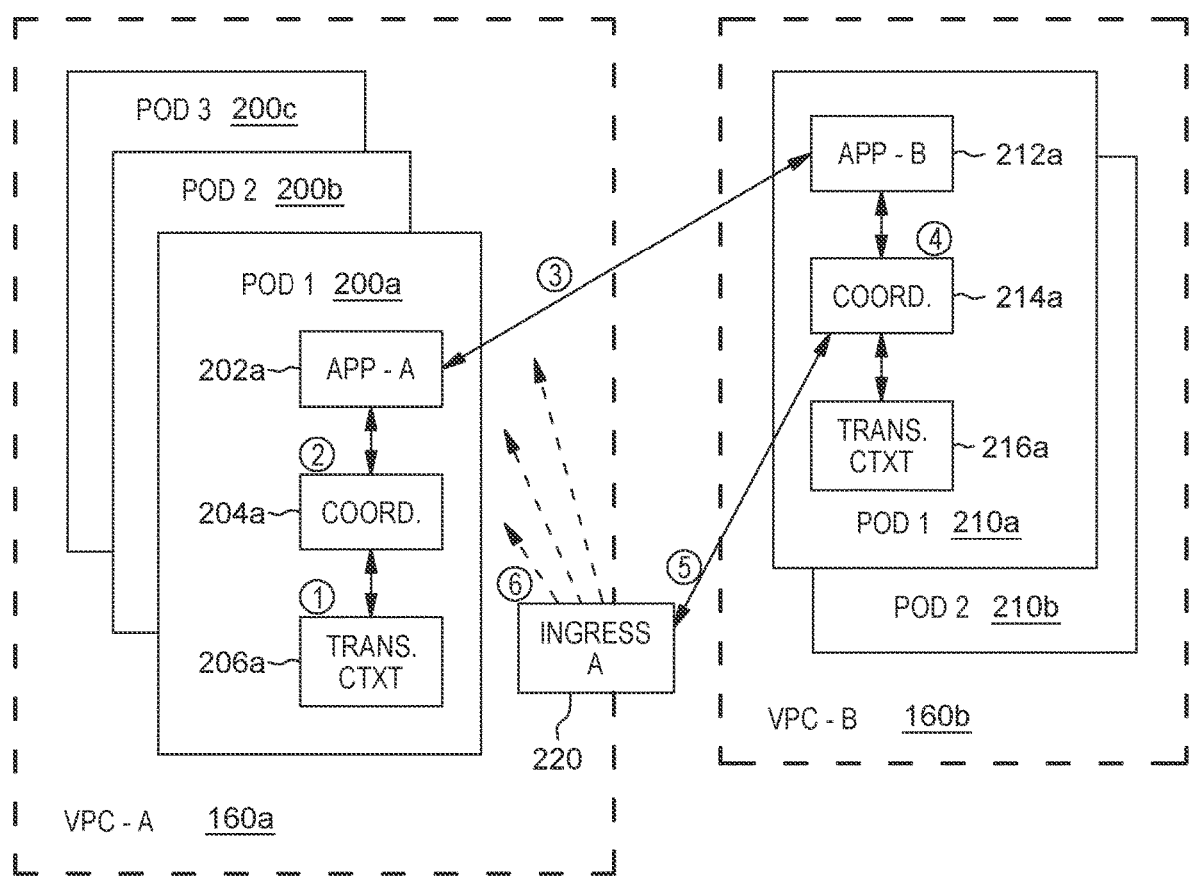
FIG. 3 is a high-level block diagram representing an example of applications executing transactions and information transfers between logical groupings of servers (pods) within a partitioned cloud computing system using typical communication protocols, and demonstrating a shortcoming to be remedied with embodiments of the invention.

FIG. 3 represents a block diagram where applications are executing transactions and information transfers between logical groupings of computing resources (pods) within a partitioned cloud computing system using typical communication protocols. In an embodiment, a first partitioned cloud computing system 160a includes multiple pods 200a, 200b, 200c, and a second partitioned cloud computing system 160b includes multiple pods 210a, 210b. In an embodiment, a first pod 200a in a first partitioned cloud computing system 160a includes an application module 202a for initiating transactions within the first pod 200a, for receiving responses from other pods, for receiving transactions initiated at other pods, and for responding to transactions initiated at other pods within the cloud computing system 100. In an embodiment, the first pod 200a includes a coordinator 204a for generating the transaction details for transactions initiated in the first pod 200a including the initiator and target addresses and the transaction context. The coordinator 204a further verifies the transaction details for responses received from other target pods to transactions initiated by the first pod 200a including the initiator and target addresses and the transaction context. The coordinator 204a also analyzes the transaction details for transactions initiated at other pods and generates coordinator contexts for responses to be transmitted to the coordinators at the initiator pods. In an embodiment, the first pod 200a further includes a location 206a for storing the transaction context that is to be used in the communication protocols for executing transactions initiated from the first pod 200a, and for verifying responses received at the first pod 200a from other pods by comparing the transaction context value in the transaction response with the transaction context value stored in the location 206a.

In an embodiment, a second pod 210a in a second partitioned cloud computing system 160b includes an application module 212a for initiating transactions within the second pod 210a, for receiving responses from other pods, for receiving transactions initiated at other pods, and for responding to transactions initiated at other pods within the cloud computing system 100. In an embodiment, the second pod 212a includes a coordinator 214a for generating the transaction details for transactions initiated at the second pod 212a including the initiator and target addresses and the transaction context. The coordinator 214a further verifies the transaction details for responses received from other target pods to transactions initiated by the second pod 212a including the initiator and target addresses and the transaction context. The coordinator 214a also analyzes the transaction details for transactions initiated at other pods and generates coordination contexts for responses to be transmitted to the coordinators at the initiator pods. In an embodiment, the second pod 210a further includes a location 216a for storing the transaction context that is to be used in the communication protocols for executing transactions initiated from the second pod 210a, and for verifying responses received at the second pod 210a from other pods by comparing the transaction context value in the transaction response with the transaction context value stored in the location 216a.

In an embodiment, the first partitioned cloud computing system 160a includes a load balancer 220 that monitors and balances the activity within each of the pods 200a, 200b, 200c in the partitioned cloud computing system 160a. The load balancer 220 directs incoming transactions and information transfers to the pods with the least amount of activity and the highest bandwidth for performing the tasks. The load balancer 220 is an important component in large computer processing systems, such as cloud computing systems 100, that process numerous transactions and service thousands of customers. Load balancers 220 increase the performance and efficiency of the cloud computing system 100.

As stated earlier, pods are logical groupings of computing resources, including but not limited to, servers, routers, networks, and storage devices, within the cloud computing system 100. In an embodiment, servers and storage devices may be dedicated to a single pod, or shared among multiple pods. In an alternate embodiment, servers and storage devices may be dedicated to a single pod, or shared among multiple pods. In another embodiment, a combination of dedicated servers and shared servers may be included in a single pod, and a combination of dedicated and shared storage devices may be included in a single pod. In addition, networks and routers also may be dedicated to a single pod or shared among multiple pods.

FIG. 3 further illustrates the processing of a transaction where the typical communication protocols can inhibit the performance and efficiency of the cloud computing system 100. In an embodiment, the application module 202a in Pod1 200a of the first partitioned cloud computing system 160a (the first Pod1 application module 202a) initiates a transaction to be handled by the application module 212a in Pod1 of the second partitioned cloud computing system 160b (the second Pod1 application module 212a). The application module 202a generates a transaction context 206a, which identifies the type of transaction to be executed and includes a unique ID value for the particular transaction (step 1). In an embodiment, the application module 202a invokes the coordinator 204a in Pod1 200a (the first Pod1 coordinator 204a) to generate a coordination context, which identifies the coordination information and communication protocols for the transaction including initiator address and the load manager 220 for the first partitioned cloud computing system 160a, and the target address in Pod1 210a of the second partitioned cloud computing system 160b (step 2). In an embodiment, the first Pod1 application module 202a sends the transaction to the second Pod1 application module 212a (step 3). In an embodiment, the second Pod1 application module 212a receives the transaction and analyzes the transaction context and the coordination context contained therein. In an embodiment, the second Pod1 application module 212a invokes the second Pod1 coordinator 214a to generate a coordination context to be used for the response to the transaction request (step 4). The second Pod1 coordinator 214a uses the load balancer 220 address in generating the coordinator context for the response. In an embodiment, the second Pod1 coordinator 214b attempts to send the coordinator context for the response to the first Pod1 coordinator 204b through the load balancer 220 (step 5). The second Pod1 coordinator 214a relies on the load balancer to direct the coordinator context for the response to the first Pod1 coordinator 204a. However, the load balancer 220 directs the transaction response, which includes the coordinator context and the transaction context, to the pod 200a, 200b, 200c with the least amount of activity and the highest amount of bandwidth (step 6). Thus, the load balancer 220 has only a one in three chance of directing the transaction response to the correct pod 200a. If the load balancer 220 directs the response to the incorrect pod 200b, 200c, the coordinator 204b, 204c within the incorrect pod 200b, 200c cannot verify the transaction response since the transaction context location 206b, 206c will not have the correct transaction context located in the first Pod1 transaction context location 206a. As such, the transaction fails and needs to be retried, and the performance of the cloud computing system 100 is degraded.

Figure 4:
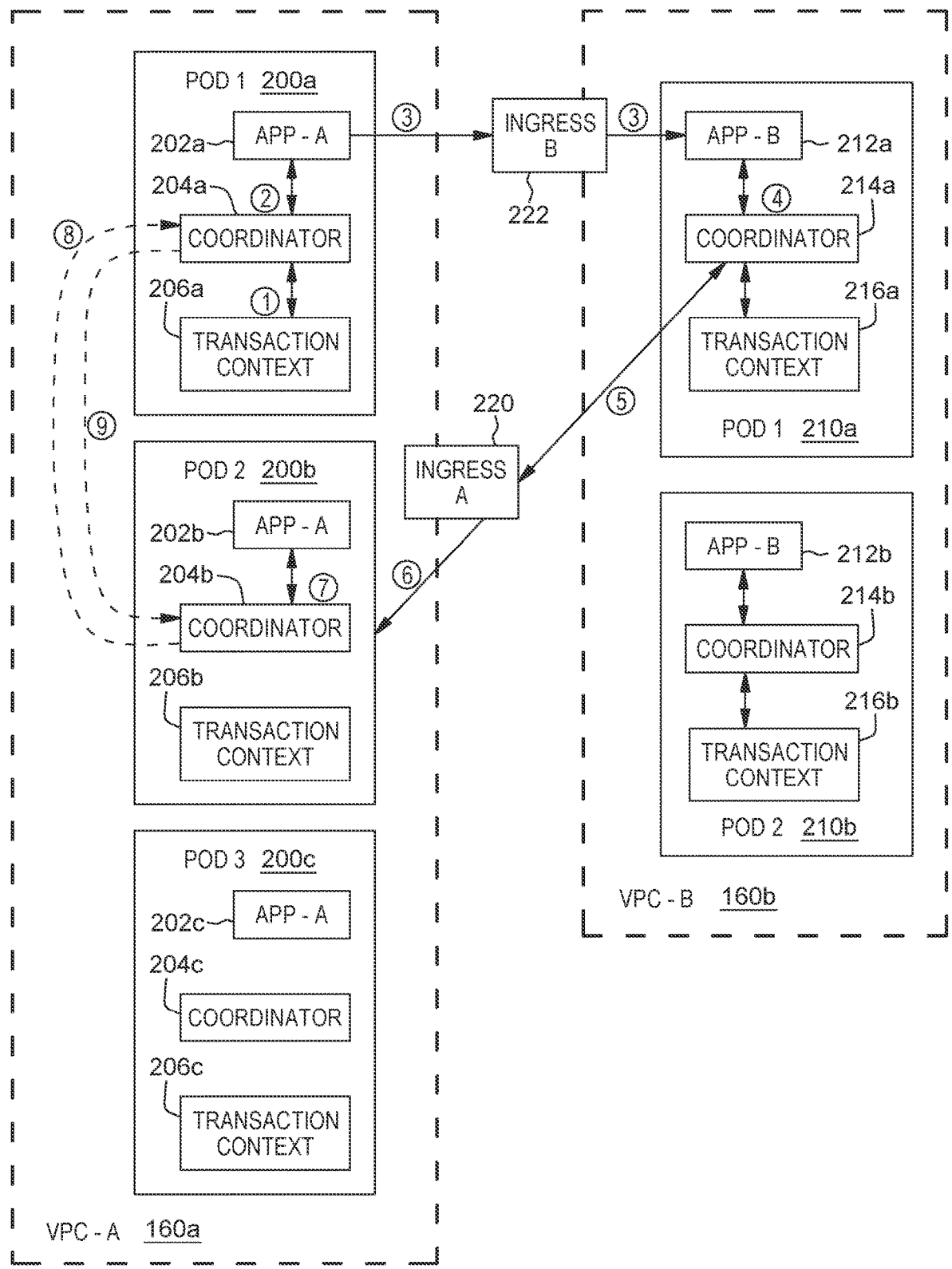
FIG. 4 is a high-level block diagram representing an example of applications executing transactions and information transfers using an improved communication protocol system between logical groupings of servers (pods) within a partitioned cloud computing system, in accordance with an embodiment of the invention.

FIG. 4 represents a block diagram where applications are executing transactions and information transfers between logical groupings of computing resources (pods) within a partitioned cloud computing system using improved communication protocols, in accordance with an embodiment of the invention. In an embodiment, a first partitioned cloud computing system 160a includes multiple pods 200a, 200b, 200c, and a second partitioned cloud computing system 160b includes multiple pods 210a, 210b. In an embodiment, a first pod 200a in the first partitioned cloud computing system 160a (the first Pod1 200a) includes an application module 202a (the first Pod1 application module 202a), a coordinator 204a (the first Pod1 coordinator 204a), and a transaction context location 206a (the first Pod1 transaction context location 206a). In an embodiment, a second pod 200b in the first partitioned cloud computing system 160a (the first Pod2 200b) includes an application module 202b (the first Pod2 application module 202b), a coordinator 204b (the first Pod2 coordinator 204b), and a transaction context location 206b (the first Pod2 transaction context location 206a). In an embodiment, a third pod 200c in the first partitioned cloud computing system 160a (the first Pod3 200c) includes an application module 202c (the first Pod3 application module 202c), a coordinator 204c (the first Pod3 coordinator 204c), and a transaction context location 206c (the first Pod3 transaction context location 206c). In an embodiment, a first pod 210a in the second partitioned cloud computing system 160b (the second Pod1 210a) includes an application module 212a (the second Pod1 application module 212a), a coordinator 214a (the second Pod1 coordinator 214a), and a transaction context location 216a (the second Pod1 transaction context location 216a). In an embodiment, a second pod 210b in the second partitioned cloud computing system 160b (the second Pod2 210b) includes an application module 212b (the second Pod2 application module 212b), a coordinator 214b (the second Pod2 coordinator 214b), and a transaction context location 216b (the second Pod2 transaction context location 216b).

As described previously, in an embodiment, each application module 202a, 202b, 202c, 212a, 212b initiates transactions within the pod in which it resides, and receives responses from other pods to the transactions that were initiated in its pod. Each application module 202a, 202b, 202c, 212a, 212b also receives transactions initiated at other pods, and responds to transactions initiated at other pods within the cloud computing system 100. In an embodiment, each coordinator 204a, 204b, 204c, 214a, 214b generates the transaction details for transactions initiated in its pod including the initiator and target addresses and the transaction context. Each coordinator 204a, 204b, 204c, 214a, 214b further verifies the transaction details for responses received from other target pods to transactions initiated within its pod including the initiator and target addresses and the transaction context. Each coordinator 204a, 204b, 204c, 214a, 214b also analyzes the transaction details for transactions initiated at other pods and generates coordinator contexts for responses to be transmitted to the coordinators at the initiator pods. In an embodiment, each transaction context location 206a, 206b, 206c, 216a, 216b stores the transaction context that is to be used in the communication protocols for executing transactions initiated from its pod, and verifies responses received from other pods by comparing the transaction context activity identifier received in the transaction response with the transaction context activity identifier stored in its transaction context location.

In an embodiment, the first partitioned cloud computing system includes a load balancer 220 that monitors and balances the activity within each of the pods 200a, 200b, 200c in the first partitioned cloud computing system 160a. In an embodiment, the second partitioned cloud computing system includes a load balancer 222 that monitors and balances the activity within each of the pods 210a, 210b in the second partitioned cloud computing system 160b. As stated previously, the load balancers 220, 222 direct incoming transactions and information transfers to the pods with the least amount of activity and the highest bandwidth for performing the tasks. The load balancers 220, 222 are an important component in large computer processing systems, such as cloud computing systems 100, that process numerous transactions and service thousands of customers. Load balancers 220, 222 increase the performance and efficiency of the cloud computing system 100.

FIG. 4 further illustrates the processing of a transaction where improved communication protocols can enhance the performance and efficiency of the cloud computing system 100, according to an embodiment of the present invention. In an embodiment, the first Pod1 application module 202a initiates a transaction to be handled by the second Pod1 application module 212a. The first Pod1 application module 202a generates a transaction context and stores it within the first transaction context location 206a. In an embodiment, the transaction context includes information about the transaction, including a value that identifies the type of transaction to be executed and a value that assigns a unique ID to the particular transaction (step 1). In an embodiment, the first Pod1 application module 202a invokes the first Pod1 coordinator 204a to generate a coordination context, which identifies the coordination information and communication protocols for the transaction. In an embodiment, the coordination context includes a target address for the transaction which identifies the load balancer 222 of the second partitioned cloud computing system 160b. In an embodiment, the coordination context further includes an initiator address which identifies the load balancer 220 in the first partitioned cloud computing system, and a supplemental initiator address which identifies uniquely the first Pod1 200a and the first Pod1 coordinator 204a. In an embodiment, the coordination context indicates the address within the transaction context location 206a where the transaction context for the particular transaction is stored (step 2). In an embodiment, the first Pod1 application module 202a sends the transaction to the load balancer 222 of the second partitioned cloud computing system 160b. The load balancer 222 directs the transaction to a pod which has sufficient bandwidth to process the transaction in an efficient, timely manner. In this example, the load balancer 222 directs the transaction to the second Pod1 210a to be handled. In an embodiment, the second Pod1 application module 212a receives the transaction (step 3).

In an embodiment, the second Pod1 application module 212a receives the transaction and analyzes the transaction context and the coordination context contained therein. In an embodiment, the second Pod1 application module 212a invokes the second Pod1 coordinator 214a to generate a coordination context to be used for the response to the transaction request (step 4). In an embodiment, the second Pod1 coordinator 214a updates the coordination context to include a supplemental address that uniquely identifies the second Pod1 210a and the second Pod1 coordinator 214a as the target address for the transaction. The second Pod1 coordinator 214a does change the initiator address in the coordination context that uniquely identifies the first Pod1 200a and the first Pod1 coordinator 204a. In an embodiment, the second Pod1 application module 212a and the second Pod1 coordinator 214a transmit a response to the transaction request to the load balancer 220 for the first partitioned cloud computing system 160a (step 5). The load balancer 220 directs the response to the pod 200a, 200b, 200c which has the most bandwidth to handle the transaction. In this case, the load balancer 220 directs the response to the first Pod2 200b for handling (step 6), which is not the pod that initiated the transaction. In an embodiment, the first Pod2 application module 202b analyzes the transaction context in the response and attempts locate the correct transaction context activity identifier in the transaction context location 206b (step 7). In this case, the transaction context activity identifier cannot be located, since the transaction was not initiated from the first Pod2 200b.

In an embodiment, the first Pod2 application module 202b invokes the first Pod2 coordinator 204b to check for a supplemental address within the coordinator context. In this case, the first Pod2 coordinator 204b discovers the supplemental address, identifies the supplemental address as corresponding to the first Pod1 200a and the first Pod1 coordinator, and forwards the response to the first Pod1 200a for handling (step 8). In an embodiment, the first Pod1 application module 202a and the first Pod1 coordinator 204a receive the forwarded transaction response, and check the transaction context in the response to determine if the transaction context activity ID included in the transaction context of the response matches the transaction context activity ID saved in the first Pod1 transaction context location 206a (step 8). In an embodiment, the first Pod1 coordinator 204a verifies that the supplemental address in the initiator address of the coordination context matches the supplemental address that uniquely identifies the first Pod1 200a and the first Pod1 coordinator (step 8). In this case, the transaction context activity ID in the transaction response matches the transaction context activity ID stored in the transaction context location 206a, and the supplemental address included in the transaction response matches the supplemental address that uniquely identifies the first Pod1 200a and the first Pod1 coordinator 204a. In an embodiment, the first Pod1 coordinator 204a responds to the second Pod1 coordinator 214a through the first Pod2 coordinator 204b that the transaction response was received and handled successfully. In this case, the first Pod1 coordinator 204a establishes a communication path with the second Pod1 coordinator 214a through the first Pod2 coordinator 204b, such that the communication protocols allow the transaction to complete successfully between the first Pod1 200a and the second Pod1 200b. Thus, the transaction did not fail even though the load balancer 220 misdirected the transaction response from the second Pod1 210a to the first Pod2 200b instead of the first Pod1 200a that initiated the transaction. As such, the improved communication protocols increase the efficiency and the performance of the cloud computing system 100.

It is understood that the block diagram of FIG. 4 is not intended to show all of the components included in logical groupings of computing resources (pods) 200n, 210n, but is intended to show only an exemplary embodiment of the components in the pods 200n, 210n facilitate improved communications within the partitioned cloud computing system 100. FIG. 4 shows only a first 160a and a second partition 160b in the cloud computing system 100, and only three pods 200a, 200b, 200c in the first partition 160a and two pods 210a, 210b in the second partition 160b. In alternate embodiments, several more partitions 160n can exist in the cloud computing system 100, and each partition may include several more pods 200n, 210n. In addition, FIG. 4 shows each pod 200a, 200b, 200c in the first partitioned cloud computing system 160a includes only an application module 202a, 202b, 202c, a coordinator 204a, 204b, 204c, and a transaction context location 206a, 206b, 206c. Likewise, FIG. 4 shows each pod 210a, 210b in the second partitioned cloud computing system includes only an application module 212a, 212b, a coordinator 214a, 214b, and a transaction context location 216a, 216b. These components and services are needed to describe the improved communications provided by the present invention. In certain embodiments, the coordinators 204n, 214n can include additional services and components for performing other tasks and functions related to executing transactions and information transfers. In certain embodiments, the application modules 202n, the coordinators 204n, 214n, the transaction context locations 206n, and the services and components included therein, can be implemented in software, firmware, hardware, or logic, or any combination thereof, and may include executable instructions, such as program modules, being executed by a computer processor or computer processing system. In general, program modules may include routines, programs, objects, components, logic, data structures, and so on that perform particular tasks or implement particular abstract data types.

Figure 5:
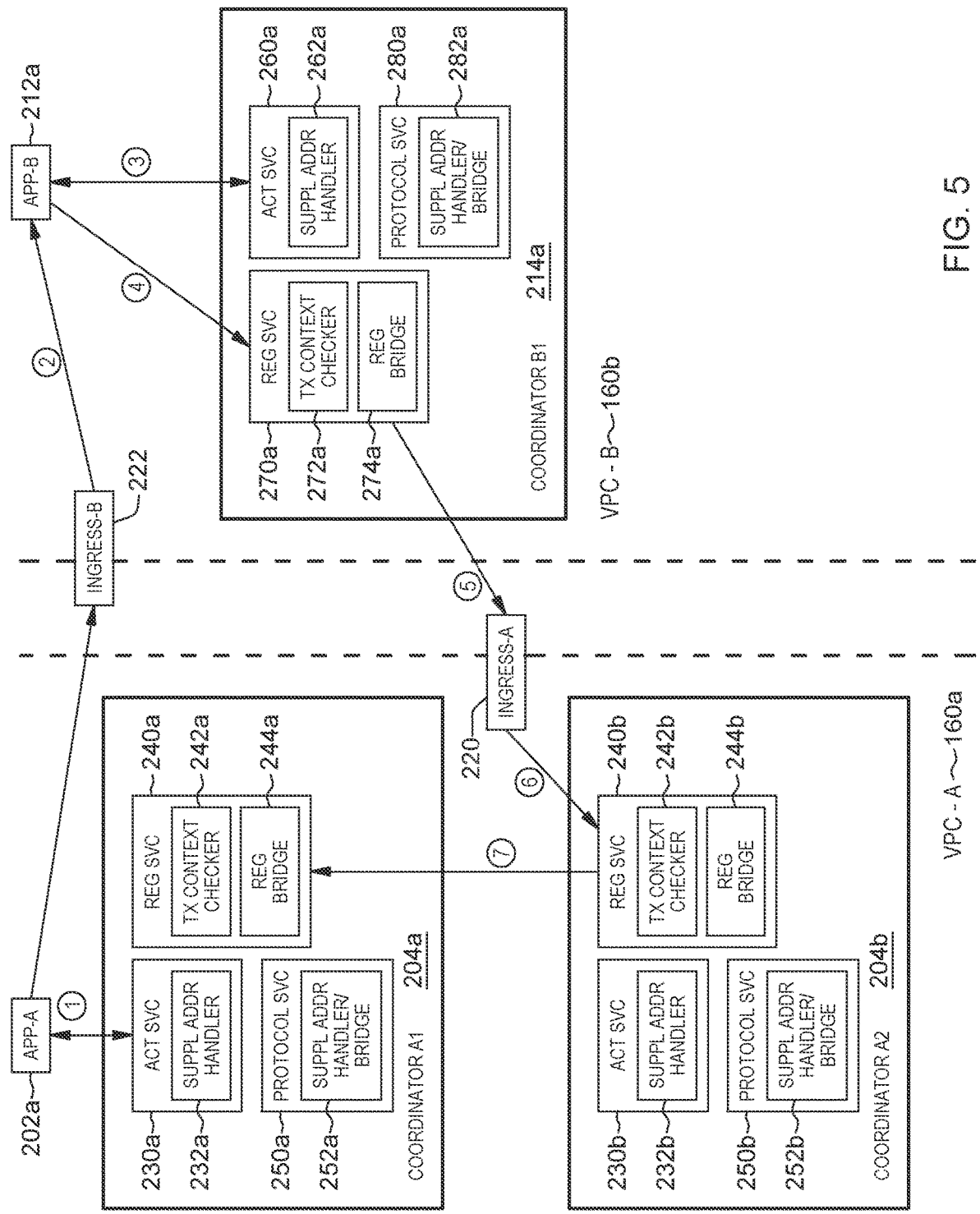
FIG. 5 is a high level block diagram representing a coordinator module for improving communications relating to transactions and information transfers within a cloud computing system, in accordance with an embodiment of the invention.

FIG. 5 represents a block diagram demonstrating improved coordinator modules implementing improved communications within a complex computer processing system, such as a partitioned cloud computing system, having logical groupings of computing resources (pods), in accordance with an embodiment of the invention. In an embodiment, a first partitioned cloud computing system 160a includes a first application module 202a (application A 202a) and a first coordinator module 204a (coordinator A1 204a) associated with a first pod (the first Pod1). The first partitioned cloud computing system 160a further includes a second coordinator module 204b (coordinator A2 204b) that is associated with a second pod, (the first Pod2). In an embodiment, a second partitioned cloud computing system includes a first application module 212a (application B module 212a) and first coordinator module 214a (coordinator B1 214a) associated with first pod (the second Pod1). As described previously, each application module 202a, 212a works with each coordinator module 204a, 204b, 214a to initiate transactions within the pod in which it resides, receive responses from other pods to the transactions that were initiated in its pod, and receive and respond to transactions initiated at other pods within the cloud computing system 100. In addition, each coordinator module 204a, 204b, 214a generates the transaction details for transactions initiated in its pod including the initiator and target addresses and the transaction context. Each coordinator module 204a, 204b, 214a further verifies the transaction details for responses received from other target pods to transactions initiated within its pod including the initiator and target addresses and the transaction context. Each coordinator module 204a, 204b, 214a also analyzes the transaction details for transactions initiated at other pods and generates coordinator contexts for responses to be transmitted to the coordinators at the initiator pods. In an embodiment, the first partitioned cloud computing system 160a includes a load balancer 220, and the second partitioned cloud computing system 160b includes a load balancer 222. As stated previously, the first load balancer 220 monitors the resource activity of each pod 200n within the first partitioned cloud computing system 160a, and directs incoming transactions and transaction responses to the pod 200n having the greatest bandwidth for handling the transaction. Similarly, the second load balancer 222 monitors the resource activity of each pod 210n within the second partitioned cloud computing system 160b, and directs incoming transactions and transaction responses to the pod 210n having the greatest bandwidth for handling the transaction.

In an embodiment, the coordinator module 204a includes an activation service 230a, a registration service 240a, and a protocol service 250a. In an embodiment, the activation service 230a receives from the application module 202a a request to create a coordination context for a specific coordination type. In an embodiment, the activation service 230a creates the coordination context, which includes the specific coordination type and a specific activity identifier associated with the coordination type. In an embodiment, the registration service 240a generates a reference pointer to the registration service 240a associated with the coordinator module 204a, which is included in the coordination context. In an embodiment, the protocol service 250a generates the communication protocol type for the specific activity identifier and a reference pointer to the protocol service 250a associated with the coordinator module 204a, which are included in the coordination context. In an embodiment, the activation service 230a further includes a supplemental address handler 232a. In an embodiment, the activation service 230a invokes the supplemental address handler 232a to generate a supplemental address that combines a unique identifier for the coordinator module 204a associated with the first pod 160a and the reference pointer to the registration service 240a. The supplemental address serves as an endpoint address for the initiator of the transaction if the coordinator module 204a is initiating the transaction. Otherwise, the supplemental address serves as an endpoint address for the target of the transaction if the coordinator module 204a is responding the transaction request.

In an embodiment, the registration service 240a includes a transaction context checker 242a and a registration bridge 244a. In an embodiment, the transaction context checker 242a checks the transaction context in a received transaction to determine if the first pod 160a and the associated coordinator module 204a are the correct target for the transaction. If the coordinator module 204a initiated the transaction, the coordinator module 204a previously saved a transaction context in a stored location that was generated by the application module 202a. In an embodiment, the registration service 240a invokes the transaction context checker 242a to verify that the transaction context in the received transaction matches the saved transaction context stored in a location within the coordinator module 204a. In an embodiment, the registration service 240a further includes a registration bridge 244a. In an embodiment, the registration service 240a invokes the registration bridge 244a to redirect the transaction to the correct pod 200n and coordinator module 204n, if the transaction context checker 242a determines that the saved transaction context does not match the received transaction context. In an embodiment, the registration bridge 244a redirects the transaction to the pod 200n and the coordinator module 204n within the first partitioned cloud computing system 160a, according to the supplemental address in the coordination context.

In an embodiment, the protocol service 250a includes a supplemental address handler and protocol bridge 252a. In an embodiment, the protocol service 250a invokes the supplemental address handler 252a to determine if the supplemental address in the coordination context matches the supplemental address for the coordinator 204a in the first pod 200a. If so, the communication protocols included in the coordination context match the communication protocols saved in the protocol service 250a and the transaction can be handled within the coordinator module 204a. If not, the protocol service 250a invokes the protocol bridge 252a to redirect the transaction to the correct pod 200n and coordinator module 204a within the first partitioned cloud computing system 160a for handling the transaction.

It is to be understood that an embodiment of coordinator A1 204a has been described herein, including embodiments for the activation service 230a, the registration service 240a, and the protocol service 250a, and further including embodiments for the supplemental address handler 232a, the transaction context checker 242a, the registration bridge 244a, and the supplemental address handler and protocol bridge 252a. In addition, coordinator A2 204b and coordinator B1 214a can be described in embodiments similar to coordinator A1 204a. As such, the activation services 230b, 260a, registration services 240b, 270a, and protocol services 250b, 280a can be described in embodiments similar to activation service 230a, registration service 240a, and protocol service 250a. Also, the supplemental address handlers 232b, 262a, transaction context checkers 242b, 272a, registration bridges 244b, 274a, and protocol supplemental address handlers and bridges 252b, 282a can be described in embodiments similar to the supplemental address handler 232a, transaction context checker 242a, registration bridge 244a, and protocol supplemental address handler and bridge 252a.

It will be further understood that the block diagram of FIG. 5 is not intended to show all of the components included in coordinator modules 204a, 204b, 214a, but is intended to show only an exemplary embodiment of the components in the coordinator modules 204a, 204b, 214a that facilitate improved communications between logical groupings of computing resources 200n, 210n within the partitioned cloud computing system 100. FIG. 5 shows only a first 160a and a second partition 160b in the cloud computing system 100, and only two pods 200a, 200b in the first partition 160a and one pod 210a in the second partition 160b. In alternate embodiments, several more partitions 160n can exist in the cloud computing system 100, and each partition may include several more pods 200n, 210n. In addition, FIG. 5 shows each coordinator module 204a, 204b, 214a includes only an activation service 230a, 230b, 260a, a registration service 240a, 240b, 270a, and a protocol service 250a, 250b, 280a, and these services include only supplemental address handlers 232a, 232b, 262a, transaction context checkers 242a, 242b, 272a, registration bridges 244a, 244b, 274a, and protocol supplemental address handlers and bridges 252a, 252b, 282a. These components and services are needed to describe the improved communications provided by the present invention. In certain embodiments, the coordinator modules 204a, 204b, 214a can include additional services and components for performing other tasks and functions related to executing transactions and information transfers. In certain embodiments, the coordinator modules 204a, 204b, 214a, and the services and components included therein, can be implemented in software, firmware, hardware, or logic, or any combination thereof, and may include executable instructions, such as program modules, being executed by a computer processor or computer processing system. In general, program modules may include routines, programs, objects, components, logic, data structures, and so on that perform particular tasks or implement particular abstract data types.

FIG. 5 further illustrates the processing of a transaction where coordinator modules 204a, 204b, 214a improve the communications between pods 200n in a cloud computing system 100, in accordance with an embodiment of the present invention. In an embodiment, application A 202a invokes coordinator A1 activation service 230a to create a coordination context for a particular transaction. Application A 202a passes a coordination type and transaction context to coordinator A1. In an embodiment, coordinator A1 activation service 230a generates a coordination context that includes the transaction context, the coordination type, a specific activity identifier associated with the coordination type, and the communication protocols associated with the coordination type. Coordinator A1 activation service 230a stores the transaction context in a location within coordinator A1 204a. In an embodiment, coordinator A1 activation service 230a invokes coordinator A1 registration service to generate a reference pointer to coordinator A1 registration service 240a. In an embodiment, coordinator A1 activation service 230a invokes coordinator A1 supplemental address handler 232a to add a unique identifier associated with coordinator A1 204a to the reference pointer of coordinator A1 registration service 240a to form an initiator supplemental address. In an embodiment, coordinator A1 activation service includes the initiator supplemental address in the coordination context for the transaction. Coordinator A1 activation service 230a returns the coordination context to application A 202a (step 1).

In an embodiment, application A 202a transmits the transaction to application B 212a through the load balancer 222 for the second partitioned cloud computing system 160b (step 2). In an embodiment, application B 212a invokes coordinator B1 activation service 260a add information to the coordination context associated with target. In an embodiment, coordinator B1 260a invokes coordinator B1 registration service 270a to generate a reference pointer to coordinator B1 registration service 270a. In an embodiment, coordinator B1 activation service 260a invokes the coordinator B1 supplemental address handler 262a to generate a unique identifier associated with coordinator B1 214a. Coordinator B1 activation service 260a combines the coordinator B1 204a unique identifier with the coordinator B1 registration service 270a to generate a target supplemental address and saves the target supplemental address within the coordination context. In an embodiment, the coordination context includes an initiator address and a target address and identifies the endpoints of the communication path between the initiator and target. In an embodiment, coordinator B1 activation service 260a returns the updated coordination context to application B 214a (step 3). In an embodiment, application B 212a determines the coordination protocols associated with the coordination type indicated in the coordination context, and invokes coordinator B1 registration service 270a and coordinator B1 protocol service 280a to identify and register the coordination protocols (step 4).

In an embodiment, coordinator B1 214a transmits the updated coordination context to the initiator in the first partitioned cloud computing system 160a through the load balancer 220 (step 5). In an embodiment, the load balancer 220 for the first partitioned cloud computing system 160a misdirects the coordination context to the A2 coordinator 204b in the second pod. In an embodiment, coordinator A2 registration service 240b invokes the coordinator B2 transaction context checker 242b to confirm whether the transaction context included in the coordination context is stored in a saved location within coordinator A2. In this instance, the coordinator A2 transaction context checker cannot locate within coordinator A2 204b the transaction context in the coordination context. In an embodiment, coordinator A2 registration service 240b checks the initiator supplemental address included in the coordination context to determine the correct coordinator module 204n to handle the coordination context. In this instance, coordinator A2 204b determines that the initiator supplemental address points to coordinator A1 204a. In an embodiment, the coordinator A2 registration service 240b invokes the coordinator A2 registration bridge 244b to redirect the coordination context to coordinator A1 204a (step 7). In certain embodiments, coordinator A2 protocol service 250b invokes the protocol supplemental address handler 252b to verify that the initiator supplemental address included in the coordination context points to coordinator A1 204a. In certain embodiments, coordinator A2 protocol service 250b invokes the coordinator A2 protocol bridge 252b to forward the coordination protocols included in the coordination context to coordinator A1 204a. In an embodiment, coordinator A1 registration bridge 240a invokes the coordinator A1 transaction context checker 242a to verify that the transaction context included in the coordination context matches a transaction context saved a location within coordinator A1 204a. In this instance, the transaction context included in the received coordination context matches a saved transaction context, and the transaction can be handled within the pod associated with coordinator A1 204a. In addition, coordinator A1 protocol service 250a saves the coordination protocols included in the coordination context and thereby establishes coordinated communication protocols to be used between the initiator and the target.

Figure 6:
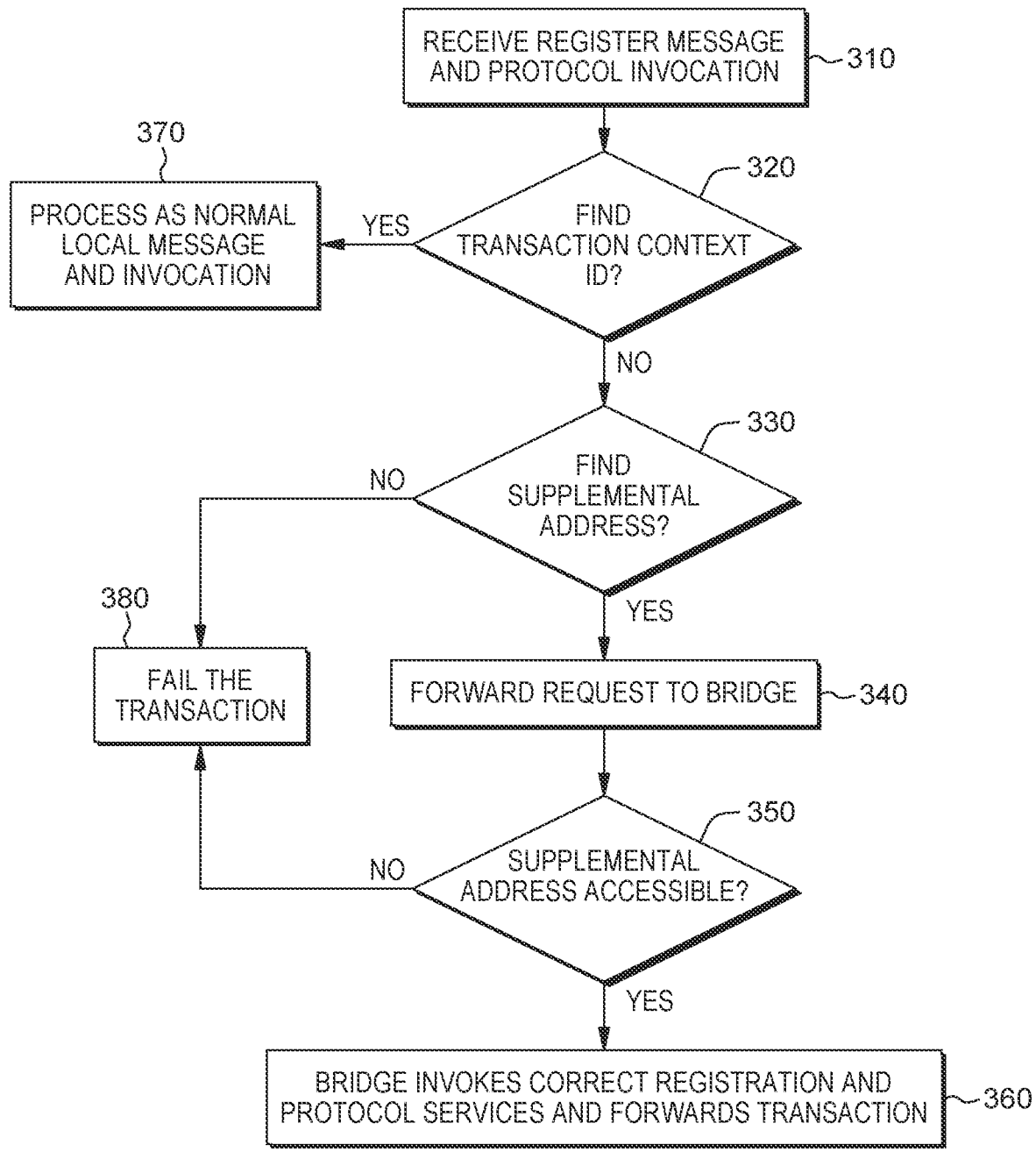
FIG. 6 is a high level logic diagram representing a computer implemented method within a coordinator module for improving communication protocols relating to transaction and information transfers within a cloud computing system, in accordance with an embodiment of the invention.

FIG. 6 represents a logic diagram of a computer implemented method 300 within a coordinator module 204a for improving communication between logical groupings of computing resources (pods) 200n within a cloud computing system 100, in accordance with an embodiment of the invention. In an embodiment, method 300 is invoked when a coordinator module 204a receives a coordination context from another coordinator module 204b directly or indirectly through a load balancer 220. In an embodiment, method 300 receives at method step 310, a coordination context relating to a transaction. The invocation occurs when the coordinator module 204a receives a coordination context from another coordinator module 204n within the same partitioned cloud computing system 160a, or from a coordinator module 214n from another partitioned cloud computing system 160b through the load balancer 220. The coordinator module 204a handles the coordination context for tasks relating to coordination registrations, or for tasks relating to coordination protocols.

In an embodiment, the method 300 determines at method step 320, whether the transaction context included in the coordination context matches a transaction context saved in a location within the coordinator module 204a. In an embodiment, the registration service 240a invokes the transaction context checker 242a to determine if the received transaction context matches a saved transaction context. If so, the method 300 proceeds to method step 370, and the coordinator module 204 continues processing the information in the coordination context. In an embodiment, the transaction context match indicates that the coordinator module 204a is the intended target for the coordination context. If the received transaction context is not saved in a location in the coordinator module 204a, the method 300 checks the supplemental address at method step 330. In an embodiment, the coordinator module 204a checks for a supplemental address in the coordination context. If no supplemental address exists in the coordination context, the method 300 fails the transaction at method step 380, and indicates that the transaction must be retried. If a supplemental address exists in the coordination context, the method 300 forwards the request at method step 340 to a bridge within the coordinator module 204a. The coordinator module 204a invokes the registration bridge 244a if the method 300 was invoked to process a task or service related coordination registrations. The coordination module 204a invokes the protocol bridge 252a if the method was invoked to process a task or service related to coordination protocols.

In an embodiment, the method 300 determines at method step 350 whether the supplemental address in the coordination context identifies an alternate coordinator module 204n that is accessible from the present coordinator module 204a. In an embodiment, the coordinator module 204a searches a storage location where the supplemental addresses of all coordinator modules 204n within the partitioned cloud computing system 160a and associated with the load balancer 220 are saved. If the coordinator module 204a finds a supplemental address match, the method 300 redirects the coordination context at method step 360 to the coordinator module identified by the supplemental address in the coordination context. In an embodiment, the coordinator module 204a invokes the registration bridge 244a to forward the coordination context to the alternate coordinator module 204n for tasks relating to coordination registrations. In an embodiment, the coordinator module 204a invokes the protocol bridge 252a to forward the coordination context to the alternate coordinator module 204n for tasks relating to coordination protocols. If the coordinator module 204a does not find a supplemental address match, the method 300 fails the transaction at step 380, and indicates that the transaction must be retried.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed:

1. A coordinator module for improving communication within a cloud computing system, the cloud computing system including a plurality of partitions, the cloud computing system partition including a plurality of logical groupings of computing resources (pods), the controller module associated with one of the plurality of pods, the coordinator module including a processing logic, a storage, and a computer program product, the computer program product comprising a non-transitory computer-readable storage medium having computer-usable program code embodied therein, the computer-usable program code configured to perform operations when executed by the processing logic, the operations comprising:

generating a coordination context in the coordinator module associated with a first pod to initiate a transaction request, the coordination context including a transaction context, a coordination type, and an initiator reference address, the coordinator module saving the transaction context in a location in the coordinator storage;

creating an initiator supplemental address by combining the initiator reference address with a unique identifier associated with the first pod, the coordinator module saving the initiator supplemental address in the storage location within the coordinator module, the initiator supplemental address uniquely identifying the coordinator module and the first pod;

transmitting the transaction request and the coordination context relating to the transaction request from the coordinator module to a target pod in a second cloud computing system partition;

receiving a transaction response at the coordinator module, the transaction response having a received coordination context, the received coordination context further including a coordination protocol type and a target supplemental address; and comparing the received initiator supplemental address in the received coordination context with the saved initiator supplemental address in the coordinator module, the coordinator module processing the transaction response if the received initiator supplemental address matches the saved initiator supplemental address.

2. The coordinator module of claim 1, further comprising:
identifying an alternate coordinator module in an alternate pod within the first cloud computing system partition to process the transaction request if the saved initiator supplemental address does not match the received initiator supplemental address, the coordinator module using the received initiator supplemental address to identify the alternate coordinator module and the alternate pod; and forwarding the transaction response and the updated coordination context from the coordinator module to the alternate coordinator module in the alternate pod.

3. The coordinator module of claim 1, wherein the coordinator module includes a registration bridge for identifying the alternate coordinator module in the alternate pod to process the transaction response, the registration bridge comparing the received initiator supplemental address with a plurality of saved supplemental addresses, the plurality of supplemental addresses corresponding to the plurality of pods within the first cloud computing system partition, the registration bridge identifying the alternate pod if the received initiator supplemental address matches a selected supplemental address; and wherein the registration bridge indicates to the coordinator module to forward the transaction response to the alternate node, the selected supplemental address matching the received initiator supplemental address, the selected supplemental address uniquely identifying the alternate pod.

4. The coordinator module of claim 1, wherein the coordinator module includes a supplemental address handler for creating the initiator supplemental address, the supplemental address handler combining the initiator reference address and the unique identifier to create the initiator supplemental address, the supplemental address handler saving the initiator supplemental address in the coordinator module storage; and wherein the supplemental address handler compares the received initiator supplemental address with the saved initiator supplemental address, the supplemental address handler indicating that the coordinator module process the transaction response when the received initiator supplemental address matches the saved initiator supplemental address.

5. The coordinator module of claim 2, further comprising:
comparing the saved transaction context with the transaction context received in the received coordination context to determine if the coordinator module should process the transaction response.

6. The coordinator module of claim 3, wherein the coordinator module includes a transaction context checker for comparing the received transaction context with the saved transaction context, the transaction context checker indicating to the coordinator module to process the transaction response if the received transaction context matches the saved transaction context.

7. The coordinator module of claim 1, wherein the first cloud computing system partition includes a first load balancer for monitoring available computing resources for the plurality of pods within the first partition, the first load balancer further directing transactions incoming to the first partition to one of the plurality of pods having the most available computing resources;

wherein the second cloud computing system partition includes a second load balancer for monitoring available computing resources for the plurality of pods within the second partition, the second load balancer further directing transactions incoming to the second partition to one of the plurality of pods having the most available computing resources;

wherein the coordinator module transmits the transaction request to the second load balancer, the second load balancer directing the transaction request to the target pod; and wherein the coordinator module receives the transaction response from the first load balancer, the first load balancer receiving the transaction response from the second partition and directing the transaction response to the first pod.

8. A method for improving communication within a cloud computing system, the cloud computing system including a plurality of partitions, the cloud computing system partition having a plurality of logical grouping of computing resources (pods), the pod including a coordinator module and at least one processor, the cloud computing system further including a computer-readable storage medium having computer-usable program code embodied therein, the computer-usable program code configured to perform operations when executed by the processor, the method comprising:

generating a coordination context in a coordinator module within a first pod to initiate a transaction request, the coordination context including a transaction context, a coordination type, and an initiator reference address, the coordinator module saving the transaction context in a storage location within the coordinator module;

creating an initiator supplemental address by combining the initiator reference address with a unique identifier associated with the first pod, the coordinator module saving the initiator supplemental address in the storage location within the coordinator module, the initiator supplemental address uniquely identifying the coordinator module and the first pod;

transmitting the transaction request and the coordination context relating to the transaction request from the coordinator module to a target pod in a second cloud computing system partition;

receiving a transaction response at the coordinator module, the transaction response having a received coordination context, the received coordination context further including a coordination protocol type and a target supplemental address; and comparing the received initiator supplemental address in the received coordination context with the saved initiator supplemental address in the coordinator module, the coordinator module processing the transaction response if the received initiator supplemental address matches the saved initiator supplemental address.

9. The method of claim 8, further comprising:
identifying an alternate coordinator module in an alternate pod within the first cloud computing system partition to process the transaction request if the saved initiator supplemental address does not match the received initiator supplemental address, the coordinator module using the received initiator supplemental address to identify the alternate coordinator module and the alternate pod; and
forwarding the transaction response and the updated coordination context from the coordinator module to the alternate coordinator module in the alternate pod.

10. The method of claim 8, wherein the coordinator module includes a registration bridge for identifying the alternate coordinator module in the alternate pod to process the transaction response, the registration bridge comparing the received initiator supplemental address with a plurality of saved supplemental addresses, the plurality of supplemental addresses corresponding to the plurality of pods within the first cloud computing system partition, the registration bridge identifying the alternate pod if the received initiator supplemental address matches a selected supplemental address; and
wherein the registration bridge indicates to the coordinator module to forward the transaction response to the alternate node, the selected supplemental address matching the received initiator supplemental address, the selected supplemental address uniquely identifying the alternate pod.

11. The method of claim 8, wherein the coordinator module includes a supplemental address handler for creating the initiator supplemental address, the supplemental address handler combining the initiator reference address and the unique identifier to create the initiator supplemental address, the supplemental address handler saving the initiator supplemental address in the coordinator module storage; and
wherein the supplemental address handler compares the received initiator supplemental address with the saved initiator supplemental address, the supplemental address handler indicating that the coordinator module process the transaction response when the received initiator supplemental address matches the saved initiator supplemental address.

12. The method of claim 9, further comprising:
comparing the saved transaction context with the transaction context received in the received coordination context to determine if the coordinator module should process the transaction response.

13. The method of claim 10, wherein the coordinator module includes a transaction context checker for comparing the received transaction context with the saved transaction context, the transaction context checker indicating to the coordinator module to process the transaction response if the received transaction context matches the saved transaction context.

14. The method of claim 8, wherein the first cloud computing system partition includes a first load balancer for monitoring available computing resources for the plurality of pods within the first partition, the first load balancer further directing transactions incoming to the first partition to one of the plurality of pods having the most available computing resources;
wherein the second cloud computing system partition includes a second load balancer for monitoring available computing resources for the plurality of pods within the second partition, the second load balancer further directing transactions incoming to the second partition to one of the plurality of pods having the most available computing resources;
wherein the coordinator module transmits the transaction request to the second load balancer, the second load balancer directing the transaction request to the target pod; and
wherein the coordinator module receives the transaction response from the first load balancer, the first load balancer receiving the transaction response from the second partition and directing the transaction response to the first pod.

15. A computer program product for improving communication within a cloud computing system, the cloud computing system including a plurality of partitions, the cloud computing system partition including a plurality of logical grouping of computing resources (pods), the pod including a coordinator module and at least one processor, the computer program product comprising a non-transitory computer-readable storage medium having computer-usable program code embodied therein, the computer-usable program code configured to perform operations when executed by the at least one processor, the operations comprising:
generating a coordination context in a coordinator module within a first pod to initiate a transaction request, the coordination context including a transaction context, a coordination type, and an initiator reference address, the coordinator module saving the transaction context in a storage location within the coordinator module;
creating an initiator supplemental address by combining the initiator reference address with a unique identifier associated with the first pod, the coordinator module saving the initiator supplemental address in the storage location within the coordinator module, the initiator supplemental address uniquely identifying the coordinator module and the first pod;
transmitting the transaction request and the coordination context relating to the transaction request from the coordinator module to a target pod in a second cloud computing system partition;
receiving a transaction response at the coordinator module, the transaction response having a received coordination context, the received coordination context further including a coordination protocol type and a target supplemental address; and
comparing the received initiator supplemental address in the received coordination context with the saved initiator supplemental address in the coordinator module, the coordinator module processing the transaction response if the received initiator supplemental address matches the saved initiator supplemental address.

16. The computer program product of claim 15, further comprising:
identifying an alternate coordinator module in an alternate pod within the first cloud computing system partition to process the transaction request if the saved initiator supplemental address does not match the received initiator supplemental address, the coordinator module using the received initiator supplemental address to identify the alternate coordinator module and the alternate pod; and
forwarding the transaction response and the updated coordination context from the coordinator module to the alternate coordinator module in the alternate pod.

17. The computer program product of claim 15, wherein the coordinator module includes a registration bridge for identifying the alternate coordinator module in the alternate pod to process the transaction response, the registration bridge comparing the received initiator supplemental address with a plurality of saved supplemental addresses, the plurality of supplemental addresses corresponding to the plurality of pods within the first cloud computing system partition, the registration bridge identifying the alternate pod if the received initiator supplemental address matches a selected supplemental address; and
  wherein the registration bridge indicates to the coordinator module to forward the transaction response to the alternate node, the selected supplemental address matching the received initiator supplemental address, the selected supplemental address uniquely identifying the alternate pod.

18. The computer program product of claim 15, wherein the coordinator module includes a supplemental address handler for creating the initiator supplemental address, the supplemental address handler combining the initiator reference address and the unique identifier to create the initiator supplemental address, the supplemental address handler saving the initiator supplemental address in the coordinator module storage; and
  wherein the supplemental address handler compares the received initiator supplemental address with the saved initiator supplemental address, the supplemental address handler indicating that the coordinator module process the transaction response when the received initiator supplemental address matches the saved initiator supplemental address.

19. The computer program product of claim 16, further comprising:
  comparing the saved transaction context with the transaction context received in the received coordination context to determine if the coordinator module should process the transaction response.

20. The computer program product of claim 17, wherein the coordinator module includes a transaction context checker for comparing the received transaction context with the saved transaction context, the transaction context checker indicating to the coordinator module to process the transaction response if the received transaction context matches the saved transaction context.

\* \* \* \* \*